No. 849,905. PATENTED APR. 9, 1907.
R. E. LEGGE.
BUSK FOR CORSETS.
APPLICATION FILED OCT. 24, 1906.
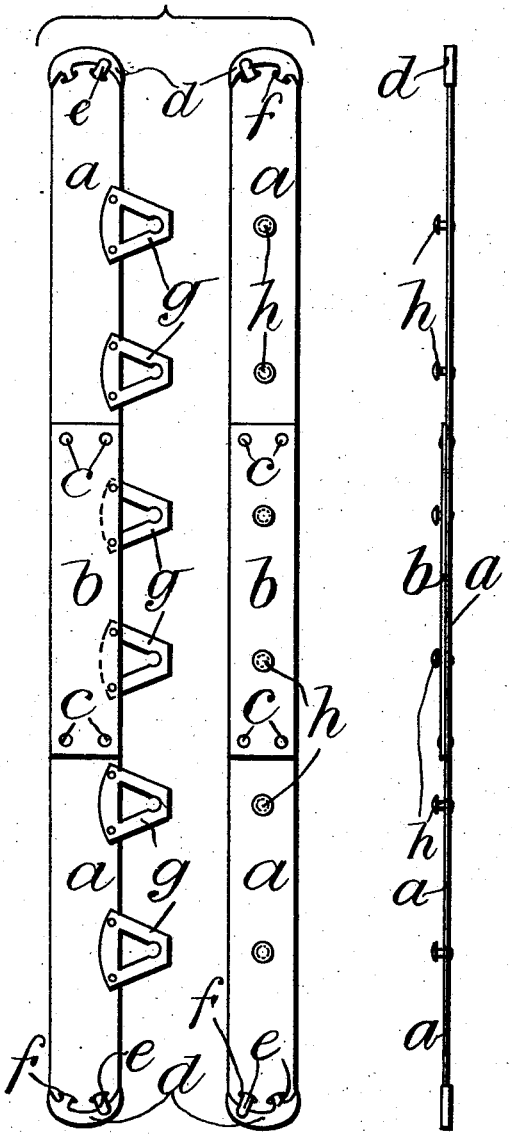
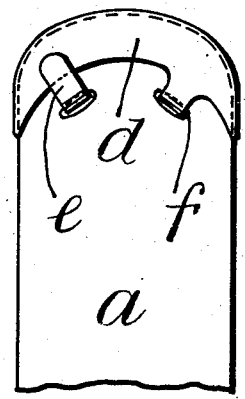
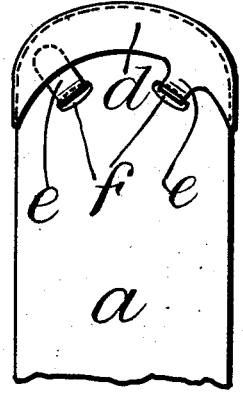
Witnesses:
L. E. Barkley.
H. E. Lawson.
Inventor:
Ruth E. Legge

UNITED STATES PATENT OFFICE.

RUTH E. LEGGE, OF SANDWICH, ENGLAND.

BUSK FOR CORSETS.

No. 849,905.      Specification of Letters Patent.      Patented April 9, 1907.

Application filed October 24, 1906. Serial No. 340,309.

*To all whom it may concern:*

Be it known that I, RUTH ELIZABETH LEGGE, residing at Fleur-de-Lys Hotel, Sandwich, Kent, England, spinster, and a citizen of the United Kingdom of Great Britain and Ireland, have invented certain new and useful Improvements in Busks for Corsets, of which the following is a specification, such as will enable others skilled in the art to which it appertains to make and use the same.

My improvement consists in rigidly attaching addition plates or bars to the busks for the purpose of strengthening them and in attaching caps or covers to the ends of the busks, said caps being of any suitable shape and having one or more tongues which are inserted through holes or slots in the busks and afterward bent so as to retain the caps in position.

I will now describe my invention with reference to the accompanying drawings, in which—

Figure 1 is a view in elevation of a pair of busks, illustrating the invention. Fig. 2 is an edge view of one of the busks. Fig. 3 is an enlarged view of an end of one busk, illustrating the invention in detail. Fig. 4 is a similar view illustrating a slight modified arrangement of the invention.

In the drawings, $a$ indicates a pair of busks and the strengthening bar or plate $b$, secured by a rivet $c$ to each end of the busk, a cap $d$, provided with tongues $e$, projecting from opposite sides of the cap adjacent opposite ends thereof and passing through openings $f$, positioned near the end of the busk. In the modified form illustrated in Fig. 4 the free end of the tongue after being passed through the apertures $f$ is inserted within the cap $d$.

$g$ and $h$ are the plates and studs for fastening the busks together.

The busks may be provided with either or both the strengthening-plates and the end caps. The shape of the plates is immaterial, providing they are suitable for their purpose, and the end caps may be of any suitable shape and have one or more tongues.

What I claim, and desire to secure by Letters Patent, is—

1. In combination with a busk having apertures near its ends, caps fitting on the ends of the busk and tongues projecting from opposite sides of the cap and passing through the openings of the busk.

2. In combination with a busk having apertures near its ends, caps fitting on the ends of the busk and tongues projecting from opposite sides of the cap and passing through the openings of the busk, said tongues being of such length as to have their free ends extending within the caps.

3. In combination, a busk having openings near its ends, caps fitting on the ends of the busk, tongues formed on opposite sides of the cap and adjacent opposite ends thereof said tongues passing through the openings in the busk.

In witness whereof I have hereunto set my hand in presence of two witnesses.

RUTH E. LEGGE.

Witnesses:
  R. A. BUDDEN,
  JOSEPH LAKE.